United States Patent [19]

Nohira et al.

[11] 4,223,645
[45] Sep. 23, 1980

[54] COMBUSTION CHAMBER OF AN INTERNAL COMBUSTION ENGINE

[75] Inventors: Hidetaka Nohira, Mishima; Sumio Ito; Teruo Kumai, both of Susono; Hisashi Oki, Numazu, all of Japan

[73] Assignee: Toyota Jidosha Kogyo Kabushiki Kaisha, Toyota, Japan

[21] Appl. No.: 55,364

[22] Filed: Jul. 6, 1979

[30] Foreign Application Priority Data

Mar. 30, 1979 [JP] Japan ............................ 54-037919

[51] Int. Cl.² .................... F02B 19/10; F02B 19/16
[52] U.S. Cl. .................................. 123/292; 123/262; 123/585; 123/670
[58] Field of Search .............. 123/32 E, 33 VC, 26, 123/143 B, 30 C, 191 A

[56] References Cited

U.S. PATENT DOCUMENTS

| 1,989,549 | 1/1935 | Cory | 123/33 VC |
| 3,765,381 | 10/1973 | Nilsson | 123/33 VC |
| 3,809,030 | 5/1974 | Molroux | 123/33 VC |

FOREIGN PATENT DOCUMENTS

| 2278920 | 3/1974 | Fed. Rep. of Germany | 123/33 VC |
| 45858 | 10/1935 | France | 123/33 VC |

Primary Examiner—Ronald B. Cox
Attorney, Agent, or Firm—Kenyon & Kenyon

[57] ABSTRACT

An internal combustion engine comprising a combustion chamber and an accumulation chamber which are interconnected to each other via an accumulation valve. The accumulation chamber is filled with catalyzer pellets for reforming the combustible mixture accumulated in the accumulation chamber. The accumulation valve is opened during the compression stroke. In the first half of the compression stroke, a jet of the reformed combustible mixture is spouted into the combustion chamber from the accumulation chamber to create a strong swirl motion in the combustion chamber. In the latter half of the compression stroke, the combustible mixture in the combustion chamber flows into the accumulation chamber where the combustible mixture accumulates under high pressure, and the mixture is then spouted into the combustion chamber at the next cycle, from the accumulation chamber.

14 Claims, 8 Drawing Figures

COMBUSTION CHAMBER OF AN INTERNAL COMBUSTION ENGINE

DESCRIPTION OF THE INVENTION

The present invention relates to an internal combustion engine.

At present, in the field of internal combustion engines, an important problem is to improve the thermal efficiency while reducing the amount of harmful components in exhaust gas. As a method of effectively reducing the amount of harmful components in exhaust gas, there has been known a method of simultaneously reducing the amount of harmful HC, CO and $NO_x$ components in the exhaust gas by using a lean air-fuel mixture, and; there has also been known a method of reducing the amount of harmful $NO_x$ components in the exhaust gas by recirculating the exhaust gas into the intake system of an engine. However, in either case wherein a lean air-fuel mixture or a mixture containing the recirculated exhaust gas therein is used, there occurs a common problem in that, since the flame speed of such a mixture is very low and, thus, the burning velocity is low, a high thermal efficiency cannot be obtained and, as a result, a high output of an engine cannot be satisfactorily obtained. Consequently, in the case wherein a lean air-fuel mixture or a mixture containing the recirculated exhaust gas therein is used, in order to improve a thermal efficiency, the most important problem is to increase the flame speed.

With regard to an engine capable of increasing the burning velocity of the combustible mixture in the combustion chamber, the present applicant has proposed an engine equipped with an accumulation chamber which is connected to the combustion chamber via an accumulation valve, so that a part of the suction gas introduced into the combustion chamber from the intake system of the engine is temporarily accumulated in the accumulation chamber. In this engine, the accumulation valve is opened from the beginning of the compression stroke to the end thereof, so that the suction gas accumulated under high pressure in the accumulation chamber is spouted from the accumulation chamber into the combustion chamber in the first half of the compression stroke. The suction gas thus spouted causes a strong swirl motion in the combustion chamber and, as a result, the burning velocity is increased.

In this engine, since the suction gas is spouted into the combustion chamber in the first half of the compression stroke as mentioned above, a strong swirl motion is created in the combustion chamber. As a result of this, since the burning velocity is considerably increased, a stable combustion can be ensured. However, in this engine, the mixture does not contribute to the work for moving the piston during the time the mixture is accumulated in the accumulation chamber. In addition, since the heat of the suction gas accumulated in the accumulation chamber escapes to the cylinder head, the temperature of the suction gas accumulated in the accumulation chamber is gradually reduced. Consequently, the suction gas accumulated in the accumulation chamber gradually loses its own energy during the time the suction gas is accumulated.

An object of the present invention is to provide an internal combustion engine capable of effectively using the time period during which the suction gas is accumulated by promoting the reforming operation of the fuel during the time the suction gas is accumulated in the accumulation chamber.

According to the present invention, there is provided an internal combustion engine comprising: a cylinder block having a cylinder bore therein; a cylinder head mounted on said cylinder block and having a cavity therein; a piston reciprocally movable in said cylinder bore; a combustion chamber formed between said cylinder head and said piston, said cavity having a port which is connected to said combustion chamber and containing a catalytic material therein for reforming a suction gas in said cavity; an intake valve movably mounted on said cylinder head for leading the suction gas into said combustion chamber; an exhaust valve movably mounted on said cylinder head for discharging an exhaust gas into the atmosphere, and; a valve means for opening said port of the cavity during the compression stroke to spout out a jet of the reformed suction gas under pressure into said combustion chamber from said cavity during the first half of the compression stroke.

The present invention may be more fully understood from the following description of preferred embodiments of the invention, together with the accompanying drawings.

DESCRIPTION OF PREFERRED EMBODIMENTS

Figure 1:
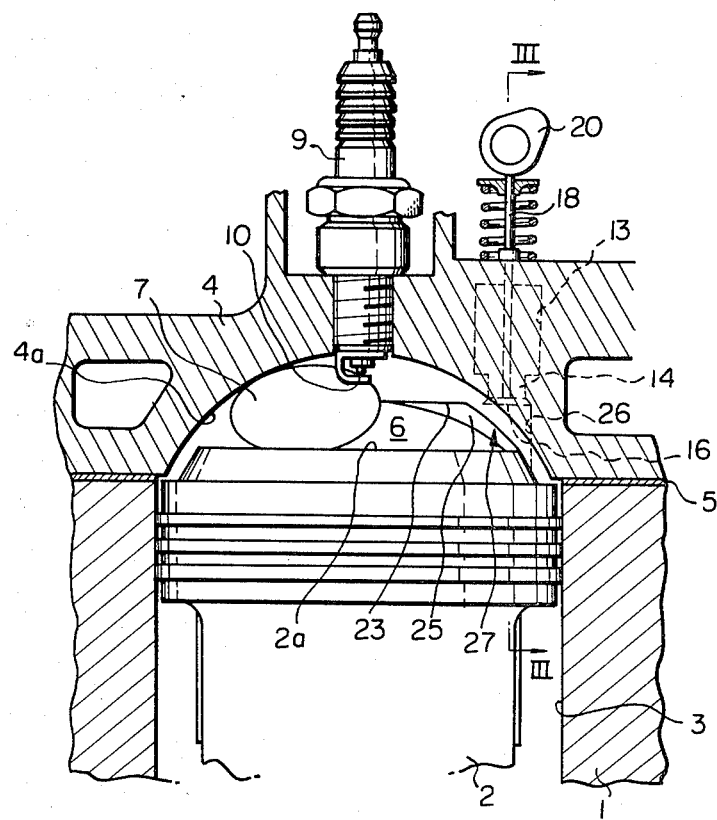
FIG. 1 is a cross-sectional side view of an embodiment of an internal combustion engine according to the present invention.
Figure 2:
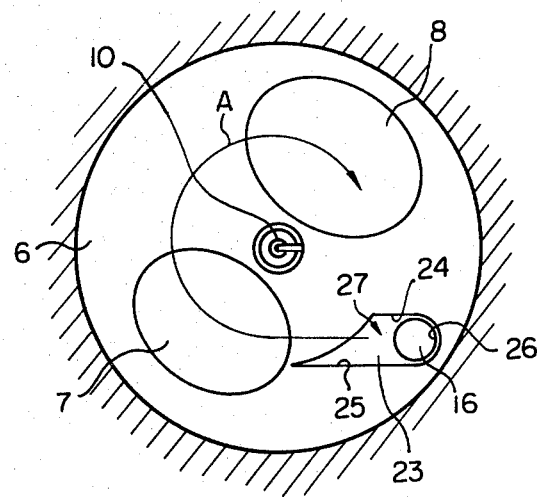
FIG. 2 is a bottom view of the cylinder head shown in FIG. 1.
Figure 3:
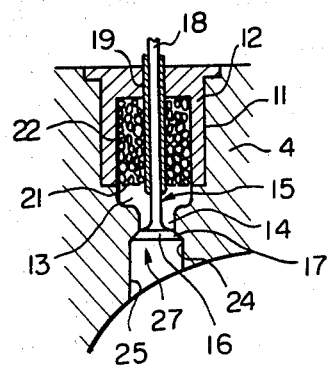
FIG. 3 is a cross-sectional view taken along the line III—III in FIG. 1.

Referring to FIGS. 1 and 2, 1 designates a cylinder block, 2 a piston reciprocally movable in a cylinder bore 3 formed in the cylinder block 1; 4 designates a cylinder head fixed onto the cylinder block 1 via a gasket 5; 6 designates a combustion chamber formed between the top surface 2a of the piston 2 and the inner wall 4a of the cylinder head 4; 7 designates an exhaust valve, 8 an intake valve, 9 a spark plug and 10 an electrode of the spark plug 9. In the embodiment shown in FIG. 1, the electrode 10 of the spark plug 9 is arranged near the apex of the semi-sperical combustion chamber 6. As is shown in FIGS. 1 and 3, according to the present invention, a circular hole 11 is formed in the cylinder head 4. A cylindrical sleeve 12 is fitted into the circular hole 11, and an accumulation chamber 13 is formed in the cylindrical sleeve 12. A valve port 14 is formed at the lower end of the accumulation chamber 13, and an accumulation valve 15 is movably arranged in the cylindrical sleeve 12 so as to open and close the valve port 14. A valve head 16 of the accumulation valve 15 is arranged to abut against a valve seat 17 formed on the cylinder head 4 so that the valve port 14 is closed when the valve head 16 abuts against the valve seat 17. On the other hand, a valve stem 18 of the accumulation valve 15 is inserted by sliding into a valve guide 19 fixed onto the sleeve 12 so that the top of the valve stem 18 projects from the upper surface of the sleeve 12. The tip of the valve stem 18 co-operates with a cam 20 connected to the crank shaft of the engine, so that the accumulation valve 15 is actuated by the cam 20 to keep the valve port 14 open during the time in which the piston 2 is positioned within a predetermined range of crank angle as described in detail hereinafter.

Referring to FIG. 3, a wire netting 21 is inserted into the accumulation chamber 13, and the peripheral edge of the wire netting 21 is supported between the cylinder head 4 and the bottom end of the sleeve 12. In addition, the inside of the accumulation chamber 13 located above the wire netting 21 is filled with a plurality of catalyzer pellets 22. These pellets 22 are formed, for example, in such a way that a reducing catalyzer such as cobalt, nickel, iron, palladium or platinum adhers onto the porous ceramic material.

As is illustrated in FIGS. 1 through 3, a groove 27, defined by a horizontal wall 23, a pair of vertical walls 24, 25 and a semi-cylindrical wall 26, is formed on the inner wall 4a of the cylinder head 4, and the valve head 16 of the accumulation valve 15 is arranged to be exposed to the inside of the groove 27. In addition, as is shown in FIG. 2, the semi-cylindrical wall 26 is arranged at a position closely adjacent to the peripheral edge of the valve head 16 so that, when the accumulation valve 15 remains open, the gas in the combustion chamber 6 flows into the accumulation chamber 13 via an opening formed between the valve head 16 and the valve seat 17, at a position located in the left side in FIG. 2; or the gas in the accumulation chamber 13 flows into the combustion chamber 6 via the above-mentioned opening. In addition, as is shown in FIG. 2, the groove 27 is formed so as to extend in the circumferential direction of the combustion chamber 6 so that the gas flowing into the combustion chamber 6 from the accumulation chamber 13 causes a swirl motion shown by the arrow A in the combustion chamber 6.

Figure 4:
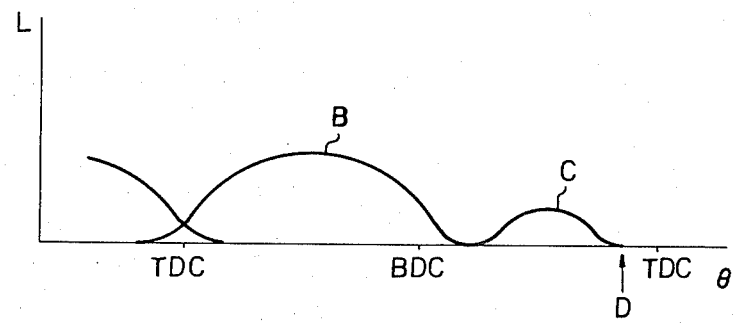
FIG. 4 is a graph showing an opening time of the valve of the accumulation chamber.

Referring to FIG. 4, the curved lines B and C indicate the opening timing of the intake valve 8 and the accumulation valve 15, respectively, and the arrow D indicates the ignition timing. In FIG. 4, the ordinate L indicates valve life and the abscissa 0 indicates crank angle. In addition, from FIG. 4, it will be understood that the accumulation valve 15 remains open at the time of the compression stroke within crank angle ranged from a crank angle near that at which the intake valve 8 is closed to a crank angle near that at which ignition is carried out by the spark plug 9.

In operation, at the time of the intake stroke, a lean air-fuel mixture or a mixture containing a large amount of the recirculated exhaust gas therein is introduced into the combustion chamber 6 via the intake valve 8. After this, when the intake valve 8 is closed and the piston 2 starts the compressing action of the combustible mixture in the combustion chamber 6, the accumulation valve 15 is opened. As is hereinafter described, a combustible mixture introduced into the accumulation chamber 13 at the compression stroke in the preceding cycle and having a high temperature and high pressure is accumulated in the accumulation chamber 13 and, on the other hand, the pressure in the combustion chamber 6 is lower than the atmospheric pressure at the start of the compression stroke. Consequently, the pressure difference between the pressure in the combustion chamer 6 and the accumulation chamber 13 is large and, thus, when the accumulation valve 15 is opened, the combustible mixture accumulated in the accumulation chamber 13 is spouted into the combustion chamber 6 at a high speed. As a result of this, a strong swirl motion shown by the arrow A in FIG. 2 is created in the combustion chamber 6. Then, if the piston 2 further moves upwards, since the pressure in the accumulation chamber 13 is maintained higher than that in the combustion chamber 6 for a while, the combustible mixture in the accumulation chamber 13 continues to be spouted into the combustion chamber 6. As a result of this, the swirl motion created in the combustion chamber 6 is further strengthened. When the piston 2 further moves upwards and the pressure in the accumulation chamber 13 becomes equal to that in the combustion chamber 6, the spouting operation of the combustible mixture in the accumulation chamber 13 is stopped. After this, when the piston 2 further moves upwards, since the pressure in the combustion chamber 6 becomes higher than that in the accumulation chamber 13, the combustible mixture in the combustion chamber 6 flows into the accumulation chamber 13. As mentioned previously, the accumulation valve 15 remains opened until the piston 2 reaches a position corresponding to a crank angle near the crank angle at which the ignition is carried out and, in addition, the temperature and the pressure in the combustion chamber 6 reach a high level when the piston 2 reaches a position corresponding to the crank angle at which ignition is carried out. Consequently, when the accumulation valve 15 is closed, the combustible mixture having a high temperature and a high pressure is accumulated in the accumulation chamber 13. As is illustrated in FIG. 3, the inside of the accumulation chamber 13 is filled with the catalyzer pellets 22 and, therefore, the combustible mixture fed into the accumulation chamber 13 remains in contact with the catalyzer pellets 22 under a high temperature of 400 through 600 degrees and under a high pressure of 5 through 7 $kg/cm^2$. As a result of this, high molecular weight hydrocarbons contained in the combustible mixture accumulated in the accumulation chamber 13 are decomposed due to the catalytic action of the catalyzer pellets 22 and reformed to low molecular weight hydrocarbons, such as hydrogen and carbonoxide. Then, this combustible mixture thus reformed is spouted into the combustion chamber 6 at the next cycle to create a strong swirl motion in the combustion chamber 6. Then, the combustible mixture in the combustion chamber 6 is ignited by the spark plug 9 immediately after or before the accumulation valve 15 is closed. At this time, since a strong swirl motion A is created in the combustion chamber 6 and, in addition, a large amount of low molecular weight hydrocarbons is contained in the combustible mixture, the flame of the mixture this ignited rapidly spreads within the combustion chamber 6 and, as a result, the burning velocity is considerably increased. In addition, since the combustible mixture in the combustion chamber 6 contains therein hydrogen and carbonoxide which have a wider range of ignitable limits as compared with that of normal gasoline, it is possible to rapidly burn the combustible mixture which is much leaner than that used in a conventional engine. As a result of this, a specific fuel consumption can be improved while reducing the amount of harmful components in the exhaust gas.

Figure 5:
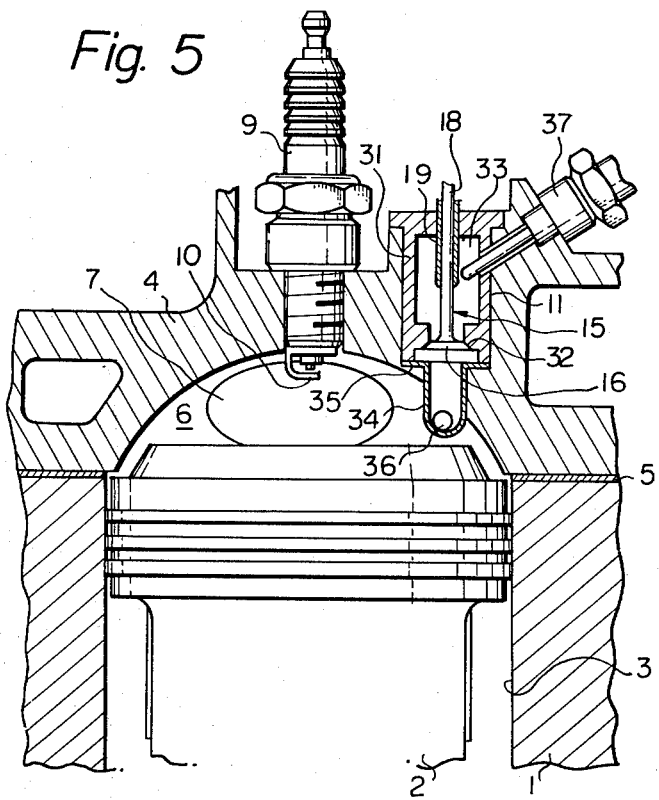
FIG. 5 is a cross-sectional side view of another embodiment according to the present invention.
Figure 6:
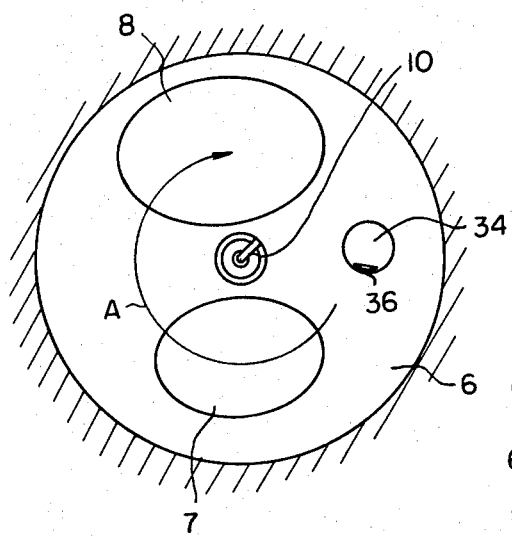
FIG. 6 is a bottom view of the cylinder head shown in FIG. 5.

FIGS. 5 and 6 illustrate another embodiment. In FIGS. 5 and 6, similar components are indicated with the same reference numerals used in FIG. 1. Referring to FIG. 5, a cylindrical sleeve 31 is fitted into the circular hole 11 formed in the cylinder head 4, and a valve seat 32 cooperating with the valve head 16 of the accumulation valve 15 is formed at the lower end of the cylindrical sleeve 31. In addition, an accumulation chamber 33 is formed in the cylindrical sleeve 31. As is illustrated in FIG. 5, the lower portion of a hollow cap 34 projects into the combustion chamber 6, and an upper flange portion 35 of the hollow cap 34 is fixed onto the cylinder head 4 by means of the cylindrical sleeve 31. In addition, as is illustrated in FIGS. 5 and 6, a single opening 36 is formed on the peripheral wall of the lower portion of the hollow cap 34 so that the opening 36 is directed tangentially to the circumferential inner wall of the cylinder head 4. In this embodiment, a reducing catalyzer, such as cobalt, nickel, iron, palladium or platinum is coated onto the entire inner wall of the accumulation chamber 33. Consequently, in this embodiment, in the same manner as described with reference to FIG. 1, the combustible mixture accumulated in the accumulation chamber 33 is reformed under high temperature and high pressure due to the catalytic action of the reducing catalyzer, and the combustible mixture thus reformed is spouted from the opening 36 into the combustion chamber 6 in the first half of the compression stroke. As a result, a swirl motion shown by the arrow A in FIG. 6 is created in the combustion chamber 6. In addition, as illustrated in FIG. 5, a glow plug 37 may be arranged in the accumulation chamber 33 for maintaining the reducing catalyzer at a high temperature and thereby promoting the activation of the reducing catalyzer.

Figure 8:
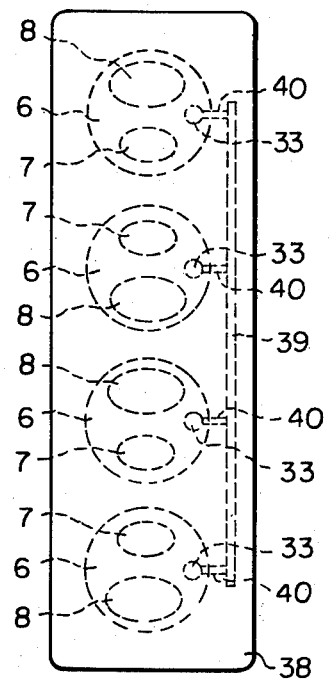
FIG. 8 is a plan view of the engine shown in FIG. 7.
Figure 7:
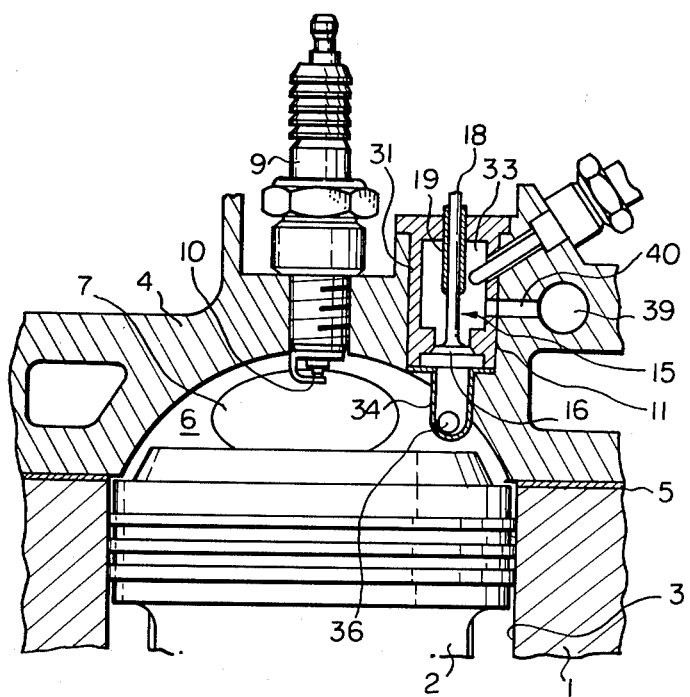
FIG. 7 is a cross-sectional side view of a further embodiment according to the present invention.

FIGS. 7 and 8 illustrate a further embodiment according to the present invention. In FIGS. 7 and 8, similar components are indicated with the same reference numerals used in FIG. 5. In this embodiment, a common connecting passage 39 extending in the longitudinal direction of an engine body 38 is formed in the cylinder head 4, and the accumulation chamber 33 of each cylinder is connected to the common connecting passage 39 via corresponding branch passages 40. In this embodiment, when the accumulation valve 15 of a given cylinder is opened, the combustible mixture accumulated in the accumulaton chamber 33 of the remaining cylinders flows into the accumulation chamber 33 of the above-mentioned given cylinder via the common connecting passage 39. As a result of this, since the pressure in all the accumulation chamber 33 becomes equal and, the mixtures accumulated in the accumulation chambers 33 are mixed with each other, the strength and the composition of the mixtures spouted from the accumulation chambers 33 becomes uniform. Thus, irregularity of combustion in each cylinder can be prevented.

According to the present invention, since the reformed combustible mixture is spouted into the combustion chamber at a high speed in the first half of the compression stroke, a strong swirl motion can be created in the combustion chamber. Besides, since the combustible mixture thus spouted contains a large amount of low molecular weight hydrocarbons therein, the flame of the mixture ignited by the spark plug rapidly spreads within the combustion chamber and, as a result, the burning velocity is considerably increased. In addition, since the range of the ignitable limits of the combustible mixture is widened by reforming the combustible mixture, the combustible mixture which is much leaner than that used in a conventional engine can be used and, as a result, the specific fuel consumption can be increased while reducing the amount of harmful components in the exhaust gas.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising:
   a cylinder block having a cylinder bore therein;
   a cylinder head mounted on said cylinder block and having a cavity therein;
   a piston reciprocally movable in said cylinder bore;
   a combustion chamber formed between said cylinder head and said piston, said cavity having a port which is connected to said combustion chamber and containing a catalytic material therein for reforming a suction gas in said cavity;
   an intake valve movably mounted on said cylinder head for leading the suction gas into said combustion chamber;
   an exhaust valve movably mounted on said cylinder head for discharging exhaust gas into the atmosphere, and;
   a valve means for opening said port of the cavity during the compression stroke to spout out a jet of the reformed suction gas under pressure into said combustion chamber from said cavity during the first half of the compression stroke.

2. An internal combustion engine as claimed in claim 1, wherein said catalytic material is made of a reducing catalyzer such as cobalt, nickel, iron, palladium or platinum.

3. An internal combustion engine as claimed in claim 2, wherein said reducing catalyzer is coated onto an inner wall of said cavity.

4. An internal combustion engine as claimed in claim 2, wherein said reducing catalyzer is adhered onto pellets.

5. An internal combustion engine as claimed in claim 4, wherein said cavity has therein a wire netting dividing said cavity into an upper interior and a lower interior, said upper interior being filled with said pellets.

6. An internal combustion engine as claimed in claim 1, wherein said engine comprises a plurality of cylinders each having said cavity and said valve means, each of said cavity being interconnected to each other via a common connecting passage.

7. An internal combustion engine as claimed in claim 1, wherein said engine further comprises a guide means for guiding said jet of the reformed suction gas to create a strong swirl motion in said combustion chamber.

8. An internal combustion engine as claimed in claim 7, wherein said guide means comprises a guide passage.

9. An internal combustion engine as claimed in claim 8, wherein said guide passage is a groove formed in an inner wall of said cylinder head.

10. An internal combustion engine as claimed in claim 9, wherein said valve means comprises a poppet valve having a vlave head which is directly exposed to said combustion chamber, said groove being formed by a pair of vertical walls and a semi-cylindrical wall located at a position closely adjacent to the peripheral edge of said valve head.

11. An internal combustion engine as claimed in claim 9, wherein said groove extends to the circumferential direction of said combustion chamber.

12. An internal combustion engine as claimed in claim 8, wherein said guide passage comprises a cylindrical hollow member fixed onto an inner wall of said cylinder head.

13. An internal combustion engine as claimed in claim 12, wherein said cylindrical hollow member comprises a cap having an opening directed to the circumferential direction of said combustion chamber.

14. An internal combustion engine as claimed in claim 1, wherein said engine further comprises an ignition means having a spark plug, said port of the cavity remaining opened over a crank angle ranged from a crank angle near that at which said intake valve is closed to a crank angle near that at which the ignition is carried out.

* * * * *